A. B. KING.
Feed Cutter and Box.
No. 58,649. Patented Oct. 9, 1866.
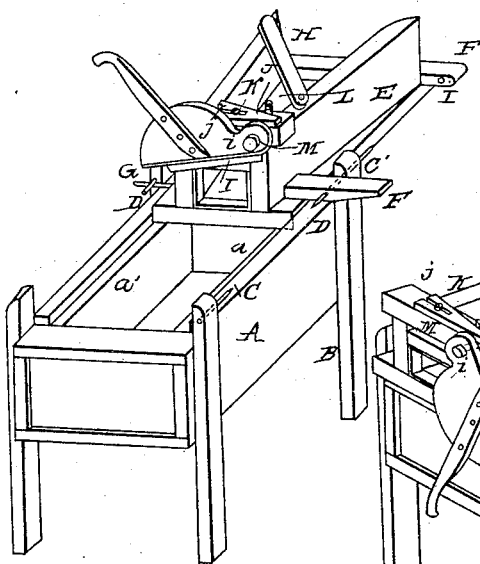
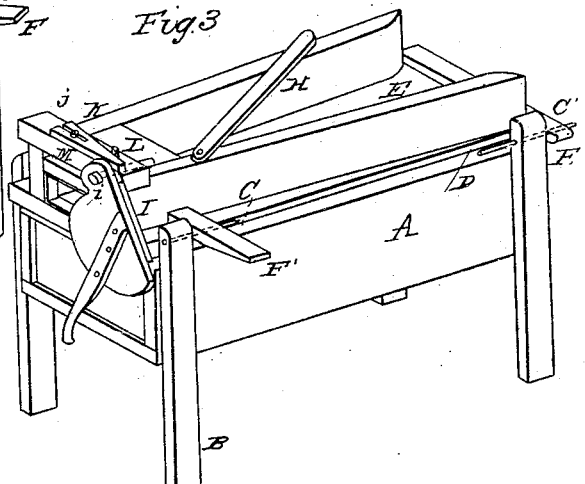
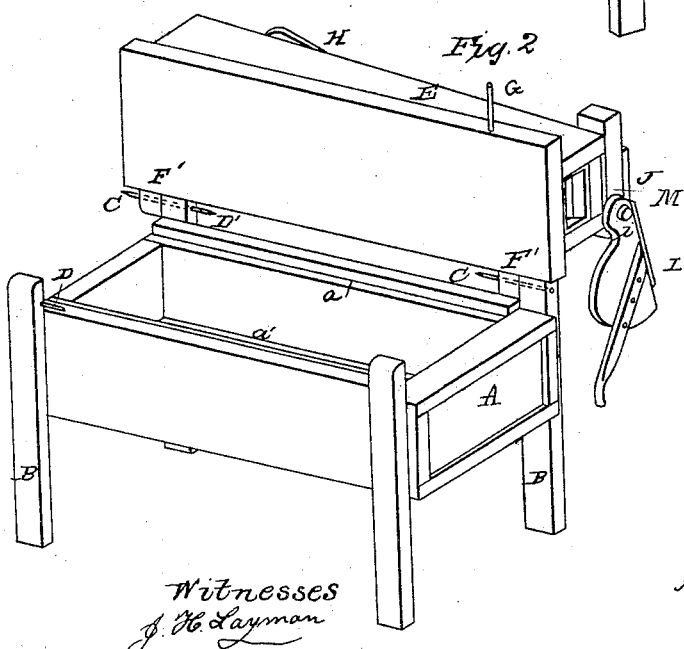
Witnesses
J. H. Layman
J. T. Hamt
Inventor
Abraham B. King
By Knight Bros
Attys.

UNITED STATES PATENT OFFICE.

ABRAHAM B. KING, OF CAMDEN, OHIO.

IMPROVEMENT IN FEED CUTTER AND BOX.

Specification forming part of Letters Patent No. 58,649, dated October 9, 1866.

*To all whom it may concern:*

Be it known that I, ABRAHAM B. KING, of Camden, Preble county, Ohio, have invented a new and useful Combined Feed Cutter and Box; and I do hereby declare the following to be a full, clear, and exact description thereof, reference being had to the accompanying drawings, making part of this specification.

My invention relates to a compact and convenient arrangement which combines the advantages of a fodder-cutting apparatus with a feed-box or manger.

Figure 1 is a perspective view, showing the cutting apparatus pushed back so as to discharge into the feed-box. Fig. 2 shows the apparatus thrown open for use as a manger. Fig. 3 shows the apparatus closed.

A is a long narrow feed-box or manger, supported on legs B, which extend above the top of the manger, and have projecting horizontally from them pins or studs C C' and D D', for purposes that will presently appear.

Two rabbets, a a', in the top of the manger, serve to guide and hold a shiftable cutting box or trough, E, having two ears or brackets, F F', having perforations f f', which, when the trough is drawn over the box, as in Fig. 3, engage upon the studs C C', so as to temporarily hinge the trough to the box, and to permit the former to be thrown open, as in Fig. 2.

G is a tongue, which, when the trough is drawn back, (see Fig. 1,) engages under the stud D, while the stud D' at the same time enters the ear F', so as to hold the trough in the position shown in Fig. 1. H is a bar pivoted to the top of the trough, and which, when the latter is about to be thrown back, as in Fig. 2, is placed obliquely across the top of the trough, so as to prevent the spilling of the contents. I is a knife pivoted to the front end of the trough at i.

J is a wedge, whose wide end is slotted at j, where it receives a tightening and guiding screw, K, and whose narrow end is confined between a stump, L, and the heel M of the knife, so that as the knife wears it can be made to shear and cut closely against the throat by slackening the screw K and advancing the wedge.

Operation: It being desired to supply the manger with cut feed, the trough is drawn back, (see Fig. 1,) and being supplied with corn-stalks or other fodder, the latter is cut into the desired lengths by means of the knife, and falls into the manger or feed-box. A sufficient quantity having been cut up, the trough is drawn forward so as for its ears to engage upon the studs, and is then opened up lid-fashion, as in Fig. 2. When done with, the trough is closed down over the box, as in Fig. 3, and, occupying the rabbets in the latter, effectually excludes dust, wet, and depredating animals.

The entire combined apparatus can be manufactured by any carpenter or millwright at an expense not exceeding an ordinary fodder-cutter, and in its closed form will occupy no more room.

I claim herein as new and of my invention—

1. The arrangement of box or manger A a a', shiftable cutting apparatus E, and hinging and supporting devices C C' D D' F F' G, substantially as set forth.

2. The bar H, pivoted to the top of the trough, for the purpose set forth.

3. The combination of knife I, adjustable wedge J, screw K, and stump L, for the purpose explained.

In testimony of which invention I hereunto set my hand.

A. B. KING.

Witnesses:
GEO. H. KNIGHT,
JAMES H. LAYMAN.